W. L. KINSEY.
Hay Elevator and Carrier.
No. 216,521. Patented June 17, 1879.
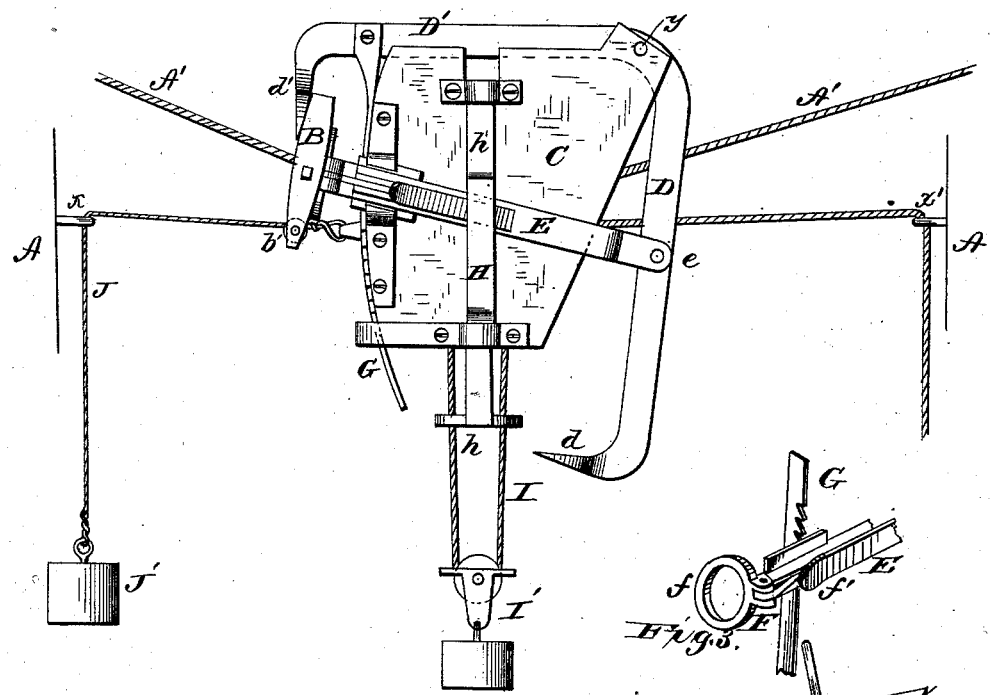
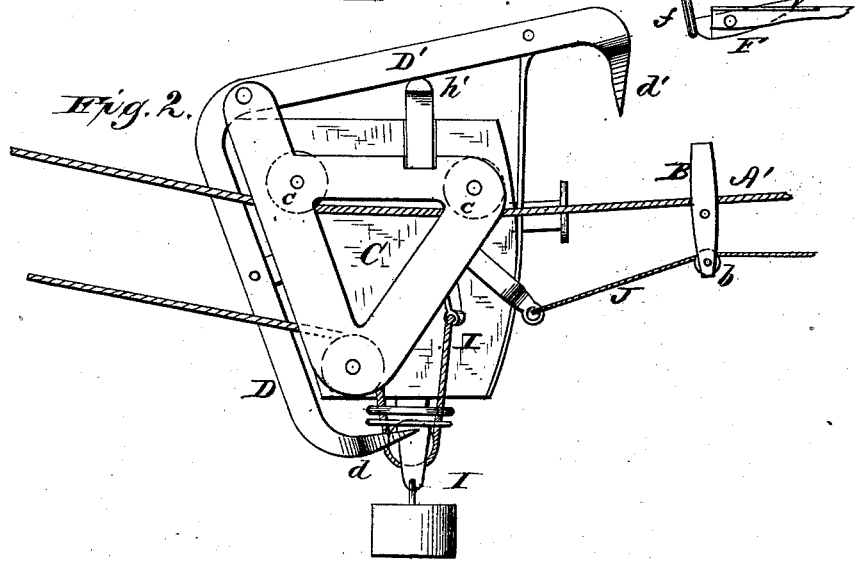
WITNESSES
INVENTOR

UNITED STATES PATENT OFFICE.

WILLIAM L. KINSEY, OF BRIDGEPORT, OHIO.

IMPROVEMENT IN HAY ELEVATORS AND CARRIERS.

Specification forming part of Letters Patent No. 216,521, dated June 17, 1879; application filed May 10, 1879.

*To all whom it may concern:*

Be it known that I, WILLIAM L. KINSEY, of Bridgeport, in the county of Belmont and State of Ohio, have invented certain new and useful Improvements in Hay Elevators and Carriers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a front elevation of my improved device at rest; Fig. 2, a back view of the same in operation, and Fig. 3 a detail.

The object of the invention is to elevate hay or other merchandise a proper distance, and then to automatically convey the same horizontally for a sufficient distance; and to that end I provide, in carrying out my invention, two standards, properly guyed and stayed, connected by a riding rope or chain, as shown. Upon this rope traverses a carriage having an elbow-lever pivoted to said carriage, each extremity of which forms bifurcations or jaws.

A sliding lever arranged vertically on the carriage and a trigger pivoted to the elbow-lever serve to trip the said elbow-lever as required.

A stop upon the riding-rope serves as a holding medium above the material to be transported, and is adapted to be grasped by the jaws of the horizontal arm of the elbow-lever.

A rope has one end secured to the carriage, passes around a pulley in a weighted hay rack or basket, over a pulley journaled in the said carriage, over a pulley upon one of the standards, and, passing over or around a pulley or base block, carries upon its free end a whiffletree or other proper power connection.

Secured to the carriage is a rope, which, passing through an orifice in the catch-stop on the riding-rope and a pulley upon the other standard, serves as a retrieving-weight to exert a constant force to keep the carriage against the catch-stop.

Referring to the drawings, A represents the standards, connected by the riding rope or chain A', upon which is a stop, B, having pulley $b$ journaled therein. Upon the riding-rope A' traverses a carriage, C, having friction-rollers $c$, as shown. Upon this carriage is pivoted at $y$ an elbow-lever composed of the arms D D', the extremities of which form jaws $d\ d'$, as shown.

Pivoted to the arm D at $e$ is a sliding trigger, E, pivoted to which is an arm, F, having an eye, $f$, through which the riding-rope A' operates. The arm F carries a knife-edge, which engages a rack-bar, G, pivoted to the arm D', as shown, and a spring, $f'$, holds the arm F $f$ in contact with the rack-bar, except when its constant force is overcome by the beveled face of the eye $f$ acting against the stop B.

H represents a vertical sliding trigger having an eye, $h$, to receive the operating-rope, and the upper end, $h'$, is adapted to abut against the lower surface of the arm D', to disengage the jaw $d'$ from the stop B, as shown in Fig. 2.

I represents a rope secured to the carriage C, which, passing over a pulley in a weighted hay rack or basket, I', and over proper pulleys $x$, is adapted to carry a whiffletree or other power-connection upon the free end.

J represents a rope, also secured to the carriage C, which, passing over pulley $b$ in the stop B and pulley $x$ on the standard A, carries a retrieving-weight, J', which serves to bring the carriage back over the merchandise to be transported, as shown.

The operation of my device is as follows: Power being applied to the rope I, the weighted hay-rack I' is elevated until the said basket or rack strikes the eye $h$ of the trigger H, which, being forced up against the arm D', elevates said arm, releases the jaw $d'$ from the stop B, and brings the arm D into operation, the jaw $d$ embracing the basket and holding the same fast. The same power now propels the carriage and load horizontally and the cargo is removed. The power then being removed, the weight J' retrieves the carriage, the eye $f$ strikes the stop B, releases the rack-bar G, and forces the arm D' $d'$ in operation, the jaw $d$ releasing the rack and weight, which gravitates to the merchandise for a new cargo.

What I claim as new is—

The elbow-lever D $d$ D' $d'$, stop B, carriage C, rack-bar G, and trigger E F $f$, combined with the rack I', rope I, spring $f'$, and slide H, as set forth.

In testimony that I claim the foregoing I have hereunto set my hand and seal this 15th day of April, 1879.

WILLIAM LORENZO KINSEY. [L. S.]

Witnesses:
    C. C. COCHRAN,
    ALONZO REED.